(12) United States Patent (10) Patent No.: US 8,171,062 B2
Hachio et al. (45) Date of Patent: May 1, 2012

(54) FILE MANAGEMENT SYSTEM

(75) Inventors: Koichi Hachio, Yokohama (JP); Hitoshi Tanaka, Yokohama (JP); Makoto Nakamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 554 days.

(21) Appl. No.: 12/219,097

(22) Filed: Jul. 16, 2008

(65) Prior Publication Data

US 2008/0281882 A1 Nov. 13, 2008

Related U.S. Application Data

(63) Continuation of application No. 11/194,475, filed on Aug. 2, 2005, now abandoned.

(30) Foreign Application Priority Data

Jun. 9, 2005 (JP) .................................. 2005-168982

(51) Int. Cl.
*G06F 12/00* (2006.01)
*G06F 17/30* (2006.01)
(52) U.S. Cl. ......... 707/821; 707/802; 711/165; 711/202
(58) Field of Classification Search .................. 707/609, 707/705, 821, 802; 711/165, 202
See application file for complete search history.

(56) References Cited

U.S. PATENT DOCUMENTS

| 5,754,756 | A | 5/1998 | Watanabe et al. |
| 5,864,853 | A | 1/1999 | Kimura et al. |
| 6,763,442 | B2 * | 7/2004 | Arakawa et al. ............... 711/165 |
| 6,795,834 | B2 | 9/2004 | Higashiura et al. |
| 7,054,893 | B2 | 5/2006 | Mogi et al. |
| 7,155,463 | B1 | 12/2006 | Wang et al. |
| 7,269,600 | B1 * | 9/2007 | Takahashi ............................ 1/1 |
| 2006/0136419 | A1 * | 6/2006 | Brydon et al. ..................... 707/9 |
| 2006/0277226 | A1 | 12/2006 | Chikusa et al. |

FOREIGN PATENT DOCUMENTS

| JP | 04362746 | 12/1992 |
| JP | 05265823 | 10/1993 |
| JP | 07121413 | 5/1995 |

OTHER PUBLICATIONS

Japanese Office Action, dated Oct. 12, 2010, issued in counterpart Japanese Patent Application.

* cited by examiner

*Primary Examiner* — Giovanna Colan
(74) *Attorney, Agent, or Firm* — Brundidge & Stanger, P.C.

(57) ABSTRACT

Since both a physical storage place and a logical storage place in a storage system are separately managed as a directory structure, or a hierarchical structure, even in such a case that the physical storage place has been changed, the logical storage place which is displayed to the user is not changed, and thus, the user can use the file while the user need not become aware of the change of the file. When the contents of a file is displayed, a physical storage destination of the file is acquired based upon both a reference path and a relative path of the file, and then, the file is acquired from the physical storage destination.

3 Claims, 13 Drawing Sheets

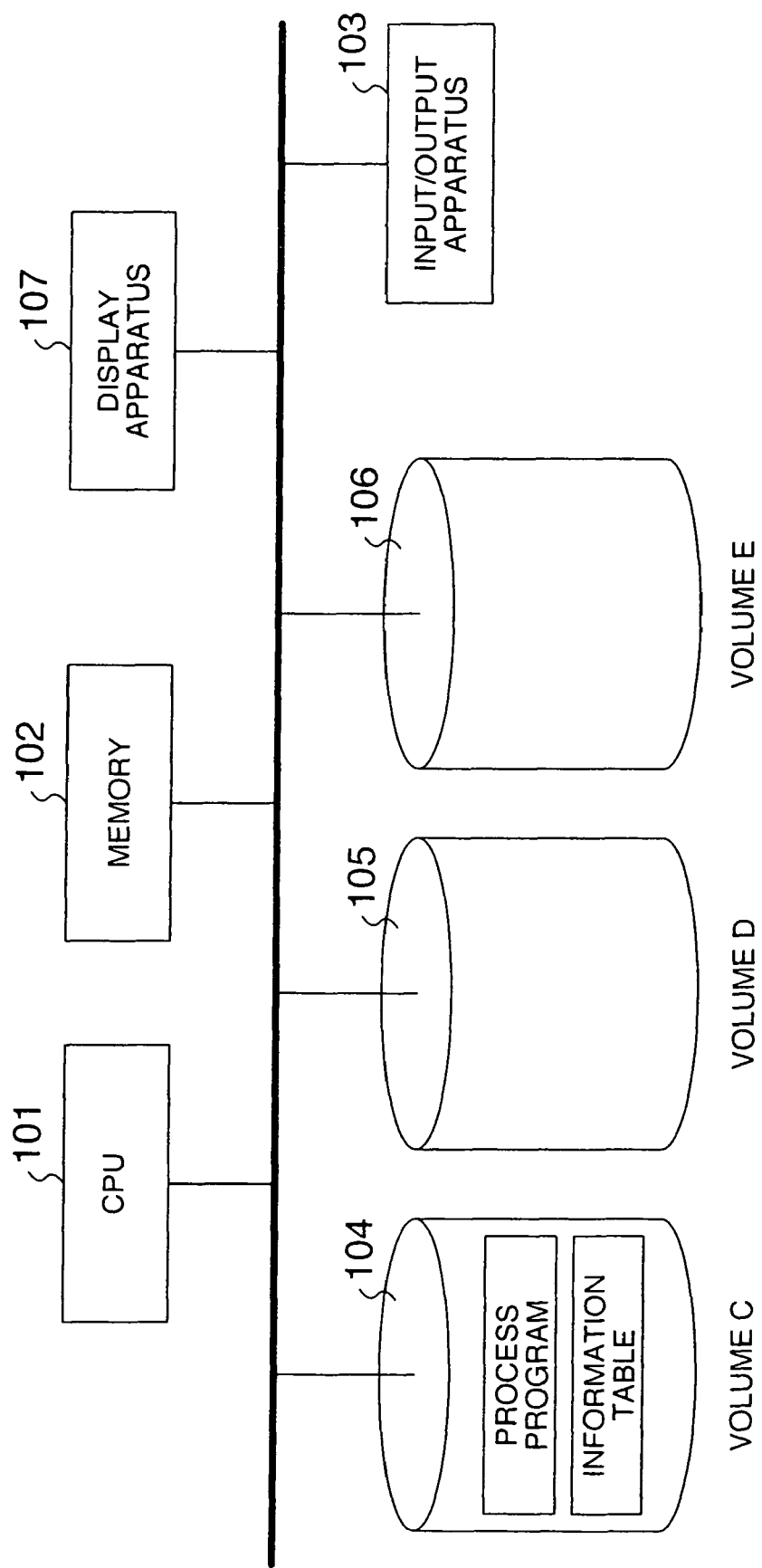

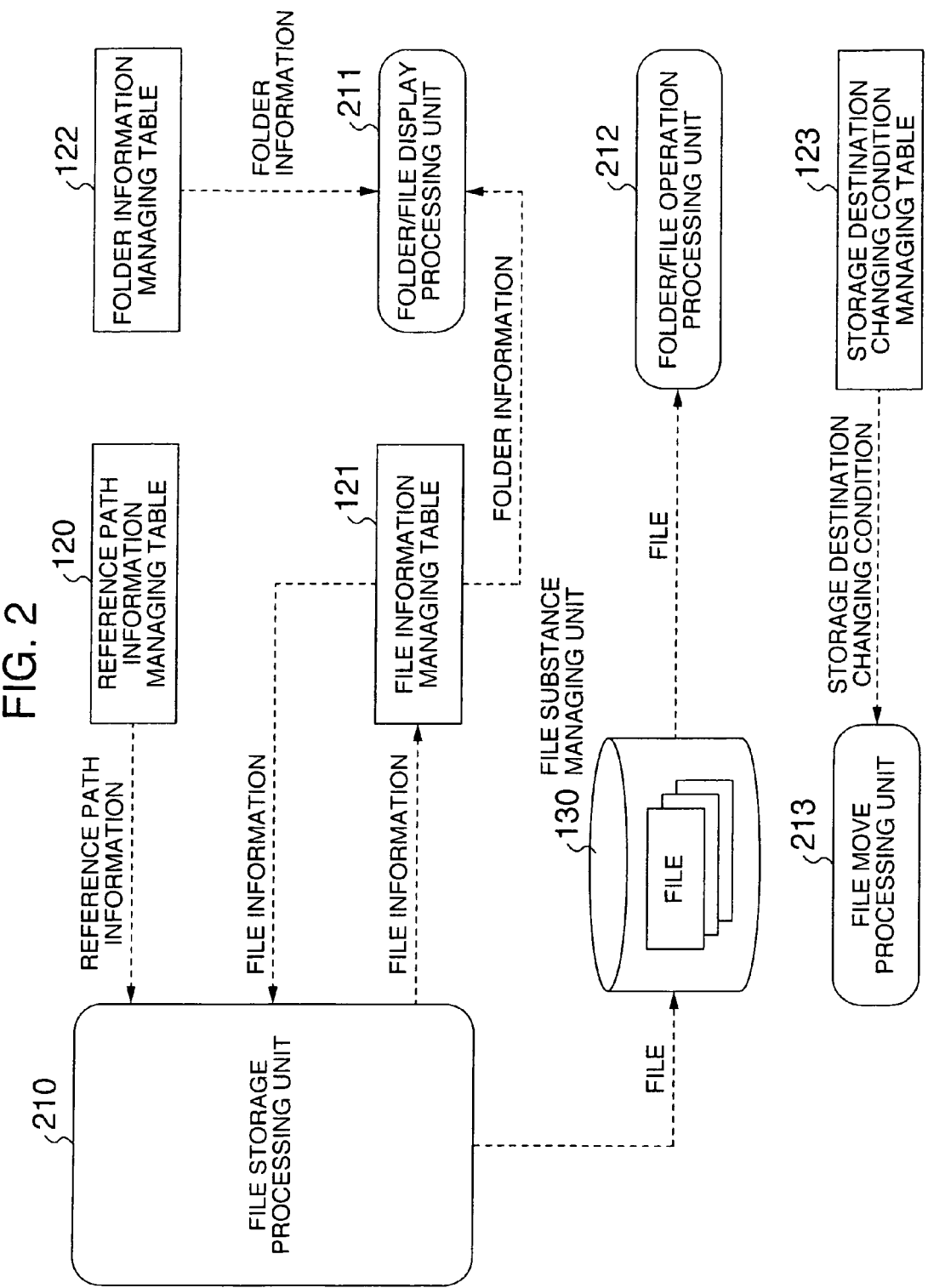

FIG. 3

REFERENCE PATH INFORMATION MANAGING TABLE 120

| REFERENCE PATH ID | SORT OF REFERENCE PATH | REFERENCE PATH | REFERENCE PATH ALLOCATING CONDITION 1 (FILE SORT) | REFERENCE PATH ALLOCATING CONDITION 2 (FILE PRODUCER) | REFERENC PATH ALLOCATING CONDITION 3 (SIZE) (UNIT:kBYTE) | EMPTY SIZE (UNIT: kBYTE) |
|---|---|---|---|---|---|---|
| Default1 | DEFAULT | D:¥Default1 | NONE | NONE | NONE | 20971520 |
| Default2 | DEFAULT | D:¥Default2 | NONE | NONE | >500 | 10485760 |
| GroupID_A | OTHER THAN DEFAULT | D:¥A | txt | USER A | NONE | 1048576 |
| GroupID_B | OTHER THAN DEFAULT | D:¥B | txt | USER B | NONE | 1048576 |
| GroupID_C | OTHER THAN DEFAULT | E:¥ | doc | NONE | NONE | 2097152 |
| GroupID_D | OTHER THAN DEFAULT | E:¥GIF | gif | NONE | NONE | 524288 |
| GroupID_E | OTHER THAN DEFAULT | E:¥JPG | jpg | GROUP H | NONE | 262144 |
| GroupID_F | OTHER THAN DEFAULT | D:¥A | NONE | USER A | NONE | 2097152 |
| GroupID_G | OTHER THAN DEFAULT | D:¥A¥Data | NONE | USER A | ≦300 | 262144 |
| Secondary_X | BACK-UP | X:¥ | NONE | NONE | NONE | 41943040 |
| Secondary_Y | BACK-UP | Y:¥ | NONE | NONE | NONE | 20971520 |
| ---- | ---- | ---- | ---- | ---- | ---- | ---- |

FIG. 4

FILE INFORMATION MANAGING TABLE 121

| FILE ID | FILE NAME | PRODUCER | SORT OF FILE | FOLDER ID OF LOGICAL STORAGE DESTINATION | REFERENCE PATH ID | RELATIVE PATH | FILE SIZE (kBYTE) | TOTAL DAYS FROM FINAL ACCESS DAY (DAYS) |
|---|---|---|---|---|---|---|---|---|
| FileID_A | FILE A | USER A | txt | FolderID_A | GroupID_A | TXTFolder¥file1.txt | 100 | 5 |
| FileID_B | FILE B | USER B | gif | FolderID_B | GroupID_B | file2.gif | 16000 | 40 |
| FileID_C | FILE C | USER C | doc | FolderID_C | GroupID_C | DOCFolder¥file2.doc | 200 | 1 |
| FileID_C2 | FILE C2 | USER A | doc | FolderID_D | GroupID_C | DOCFolder¥file3.doc | 300 | 35 |
| ---- | ---- | ---- | ---- | ---- | ---- | ---- | ---- | ---- |

FOLDER INFORMATION MANAGING TABLE 122

| FOLDER ID | FOLDER NAME | MOTHER FOLDER ID | RELATIVE PATH |
|---|---|---|---|
| FolderID_A | FOLDER A | VolumeX | TXTFolder¥ |
| FolderID_B | FOLDER B | FolderID_A | NONE |
| FolderID_C | FOLDER C | FolderID_B | DOCFolder¥ |
| FolderID_D | FOLDER D | FolderID_B | DOCFolder¥f |
| ⋮ | ⋮ | ⋮ | ⋮ |

FIG. 6

STORAGE DESTINATION CHANGING CONDITION MANAGING TABLE  123

| STORAGE DESTINATION CHANGING CONDITION ID | MOVE SOURCE REFERENCE PATH ID | MOVE DESTINATION REFERENCE PATH | SORT OF STORAGE DESTINATION CHANGING CONDITION | VALUE OF STORAGE DESTINATION CHANGING CONDITION |
|---|---|---|---|---|
| ConditionID_A1 | GroupID_A | X:¥ | AVERAGE VALUE OF PRECEDING ACCESS DAYS OF FILE UNDER REFERENCE PATH | LARGER THAN, OR EQUAL TO 7 DAYS |
| ConditionID_A2 | GroupID_A | Y:¥ | AVERAGE VALUE OF PRECEDING ACCESS DAYS OF FILE UNDER REFERENCE PATH | LARGER THAN, OR EQUAL TO 30 DAYS |
| ConditionID_B1 | GroupID_B | Z:¥ | AVERAGE VALUE OF PRECEDING ACCESS DAYS OF FILE UNDER REFERENCE PATH | LARGER THAN, OR EQUAL TO 30 DAYS |
| ConditionID_C | GroupID_C | Secondary_X | PRECEDING ACCESS DAYS OF FILE | LARGER THAN, OR EQUAL TO 30 DAYS |
| ConditionID_C2 | GroupID_C | Secondary_Y | TOTAL SIZE OF FILE UNDER REFERENCE PATH | LARGER THAN, OR EQUAL TO 1024 MBYTES |
| ---- | ---- | ---- | | ---- |

FILE MANAGEMENT SYSTEM

INCORPORATION BY REFERENCE

The present application is a continuation application to U.S. patent application Ser. No. 11/194,475, filed Aug. 2, 2005, now abandoned and claims priority from Japanese application JP2005-168982 filed on Jun. 9, 2005, the content of which is hereby incorporated by reference into this application.

BACKGROUND OF THE INVENTION

The present invention is related to a file managing system and a file managing method, in which file substances are managed outside a database.

As to documents having reusable characteristics which are known as medical application documents and commercial-purpose presentation documents, effective utilizations of knowledge and information which have been stored in organizations may constitute important factors in order to improve business efficiencies. To this end, such information related to files must be managed in connection with these files in order that not only these files are merely and commonly used, but also these files may be readily retrieved by users who intend to utilize these files. As means capable of managing files and information related to these files, such a general-purpose method has been proposed. That is, while both these files and the information related to these files have been stored in a data base, the files and the related information are managed.

However, in such a case that files are stored inside a database, if updating operations of the stored files are frequently carried out, then access operations to this database are frequently carried out in order to acquire and/or updating these stored files. As a result, there is such a problem that an entire throughput as to this database is lowered.

To solve this problem, the following managing idea may be conceived. That is, while only storage destinations of files are managed in a database, these files themselves are managed outside the database. In the case that the file themselves are managed outside this database, there are some methods that while a plurality of disks are prepared which constitute storage destinations of these files, these plural disks are utilized in a higher efficiency. These file managing methods have been proposed in, for instance, JP-A-8-249132.

SUMMARY OF THE INVENTION

Generally speaking, cost of storage apparatus operable in higher accessing speeds is increased, whereas cost of storage apparatus operable in lower accessing speeds is decreased. As a consequence, in such managing systems that files are stored outside databases and information as to storage destinations of these files is managed inside the databases, in the case that storage capacities of storage apparatus are decreased in connection with increases of data amounts, files whose accessing frequencies are high can be stored in storage apparatus operable in high accessing speeds, and files whose accessing frequencies are low can be stored in storage apparatus operable in low accessing speeds.

When system managers perform the above-described selective file storing operations, very cumbersome works are necessarily required, and furthermore, since storage destinations of files are changed, users must become aware of such a fact that the storage destinations of these files have been changed.

An object of the present invention is to provide a file managing system and a file managing method, capable of performing file operations, while users need to be aware of physical storage destinations of files.

To achieve the above-described object, both a means for automatically determining a storage destination of a file since a system manager has previously set an allocation condition of the storage destination of the file, and also, another means for automatically changing a storage destination of a file since the system manager has previously set a condition for changing the storage destination of the file are provided. Also, a logical storage destination of a file to which a user accesses, and a physical storage destination of a file substance are separately managed. This file managing method may give such an effect that when the physical storage destination of the file is changed, the user need not become aware of the storage destination of the file.

In another embodiment mode, while such a meaningful group as a file sort, a user, a group to which the user belongs is employed as reference path information, an ID is set with respect to the file, and then, reference paths are managed every reference path ID. When a file is registered, a reference path which is allocated to the file is acquired, and then, a physical storage destination of the file is determined. At this time, the user need not become aware of the physical storage destination of the file.

In another embodiment mode, when a file is displayed, a physical storage destination of the file is acquired based upon both a reference path and a relative path of the file, and then, the file is acquired from the physical storage destination. When the storage destination of the file is changed, a confirmation is made as to whether or not a storage destination changing condition can be satisfied every reference path ID so as to judge such a reference path, the storage destination of which is changed.

In a further embodiment mode, both are acquired based upon both a reference path before being changed and a reference path after being changed, and then, the file is moved from the storage destination of the file before being changed into the storage destination after being changed. Also, the reference path for changing the storage destination is changed into the reference path with respect to the storage destination after being changed.

In accordance with the present invention, since the logical storage destination of the file to which the user accesses and the physical storage destination of the file are separately managed, even in such a case that the physical storage destination of the file is changed, the user can operate the file while the user need not become aware of the physical storage destination of the file.

BRIEF DESCRIPTION OF THE DRAWINGS

FIG. 1 is a diagram for schematically showing an arrangement of a file managing system according to an embodiment mode of the present invention.

FIG. 2 is a diagram for illustratively representing a relationship between a process program and an information program employed in the file managing system of FIG. 1.

FIG. 3 is a diagram for schematically indicating an example of a reference path information managing table shown in FIG. 2.

FIG. 4 is a diagram for schematically representing an example of a file information managing table shown in FIG. 2.

FIG. 6 is a diagram for schematically representing an example of a storage destination changing condition managing table shown in FIG. 2.

DETAILED DESCRIPTION OF THE EMBODIMENTS

Figures 5, 7:
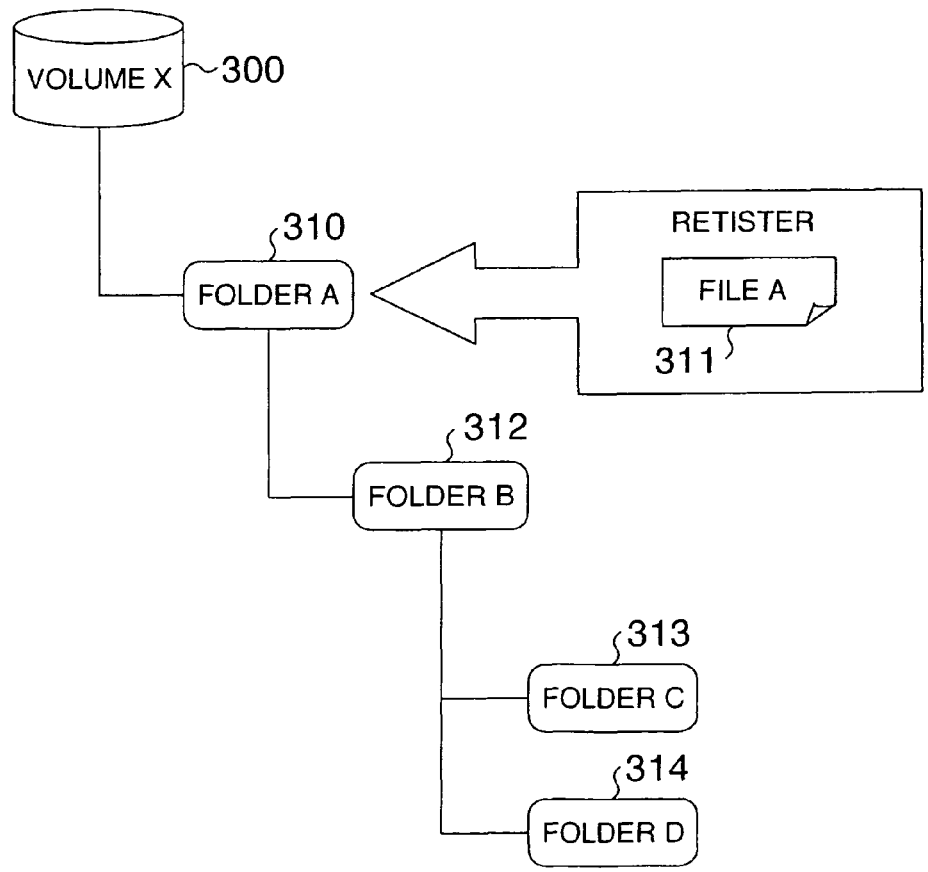
FIG. 5 is a diagram for schematically indicating an example of a folder information managing table shown in FIG. 2.
FIG. 7 is a diagram for illustratively showing such an example that a user designates a folder so as to register a file.

Next, a description is made of various embodiment modes of the present invention.

Referring now to FIG. 1, a schematic arrangement of a file managing system according to this embodiment mode will be described. The file managing system according to this embodiment mode is provided with a CPU 101, a memory 102, an input/output apparatus 103, a volume 104 containing both a process program and an information table, both a volume 105 and another volume 106 which constitute storage destinations of file substances, and a display apparatus 107. A volume corresponds to a storage apparatus, and may be realized as a physical volume, or a logical volume. Alternatively, as a storage apparatus, this volume may be realized as a back-up apparatus which uses back-up media, for instance, not only a so-called "hard disk", but also an optical disk, a magnetic disk, and a magnetic tape (concretely speaking, DVD, CD-R, tape etc.). In the file managing system of FIG. 1, as volumes which constitute the storage destinations for the process program, the information table, and the file substance, separate volumes C, D, E are provided. Alternatively, these process program, information table, and file substance may be managed by employing the same volume. Also, in the case that separate volumes are employed so as to manage these process program, information table, and file substance, these separate volumes may be realized by such individual volumes which are employed in separate file managing systems which are connected to each other via a network. The process of the volume 104 is loaded to the memory 102, and is executed by the CPU 101.

Contents of both the process program and the information table will now be explained with reference to FIG. 2. The information table is constituted by a reference path information managing table 120, a file information managing table 121, a folder information managing table 122, and a storage destination changing condition managing table 123. In the reference path information managing table 120, while a path which constitutes a reference of storage destination of a file is defined as a reference path, information used to allocate this reference path to the file is managed. The file information managing table 121 is used to manage information related to a file, for instance, a storage destination of a file, and a size of a file. The folder information managing table 122 is used to manage information of a logical folder. The storage destination changing condition managing table 123 is used to manage information used to change a storage destination of a file. Substances of files corresponding to file information managed in the file information managing table 121 are stored in a file substance managing unit 130. It should be understood that detailed contents as to the respective information tables will be described later.

It should also be noted that a path implies a character string which indicates a location of a file, or a folder within a storage apparatus, and corresponds to an address of this file, or this folder within a computer. In MS-DOS (registered trademark) and Windows (registered trademark), while a storage apparatus is arranged in such a tree structure that a drive name ([C:¥] etc.) is used as a vertex, a description of all of routes from this vertex up to data of either a target file or a target folder along this tress structure corresponds to an "absolute path." For example, such a path of [D:¥A¥ TXTFolder¥ file1.txt] designates such a file of [file. txt] stored in a folder of [TXTFolder] contained in a folder named "A" present in a drive "D." In contrast, a description of a route from a present position which constitutes a starting point up to either a target file or a target folder corresponds to a "relative path." For instance, such a relative path of [../../file2.txt] designates such a file of [file2.txt] present in a holder located at two hierarchical layers higher than the present folder. Another relative path of [TXTFolder¥ file3.txt] designates such a file of [file3.txt] present in a folder of [TXTFolder] located under the present folder.

Also, a folder implies a storage place used to classify and sort out files in a storage apparatus such as a hard disk and a CD-ROM. While a specific name (folder name) may be given to a folder for an identification purpose, since a plurality of files which are related to each other are combined to be stored in a single folder, a storage apparatus may be effectively managed. Also, folders may be furthermore formed within a single folder, and thus, a precise classification may be expressed by a hierarchical structure. It should also be noted that such a storage place is called as a "folder" in Windows and Mac OS, whereas a similar concept is referred to as a "directory" in UNIX (registered trademark) and MS-DOS.

The process program is constituted by a file storage processing unit 210, a folder/file display processing unit 211, a folder/file operation processing unit 212, and a file move processing unit 213. The file storage processing unit 210 acquires information of the reference path information managing table 120 and then stores the acquired information into the file substance managing unit 130. The folder/file display processing unit 211 displays on the display apparatus 107, a structure of a logical folder by which a user operates a file, based upon information of both the file information managing table 121 and the folder information managing table 122. The folder/file operation processing unit 212 executes such an operation that the user has operated with respect to either a logical folder or a folder. The file move processing unit 213 changes a storage destination of a file in accordance with information stored in the storage destination changing condition managing table 123. The above-described respective processing units may be realized by that the process program is executed by the CPU 101. It should also be noted that detailed contents of the respective process programs will be explained later.

Referring now to FIG. 3, concrete information managed by the reference path information managing table 120 is explained. In the reference path information managing table 120, the following information of paths is managed: That is, reference path IDs which are such IDs for exclusively identifying reference path information; sorts of reference paths which indicate either reference path information of defaults where reference path allocating conditions are not set, or reference path information other than defaults where reference path allocating conditions have been set; reference paths corresponding to such paths which constitute references of physical storage destinations of files; and references of file storage destinations such as reference path allocating conditions which constitute such conditions for determining reference paths when files are stored, are managed by the reference path information managing table 120.

Referring now to FIG. 4, concrete information managed by the file information managing table 121 is explained. In the file information managing table 121, the following information related to files is managed: That is, file information managing table 121 manages file IDs which are such IDs for exclusively identifying file information; file names corresponding to titles of files which are displayed to a user; sorts of files; producers of files; relative paths of storage destinations with reference to reference paths; reference path IDs of storage destinations of files; sizes of files; and logical storage destinations of files.

The folder information managing table 122 is used when a logical folder structure is displayed to a user in the folder/file display processing unit 211. Reference to FIG. 5, concrete information managed in the folder information managing table 122 is explained. This folder information managing table 122 manages the following information related to folders: That is, this folder information managing table 122 manages folder IDs corresponding to such IDs which are used to exclusively identify folder information; folder names corresponding to titles of folders which are displayed to a user; mother folder or parent folder IDs for indicating that folders are present under which mother folder; and relative paths which are set to file information when files are registered in folders.

While the storage destination changing condition managing table 123 has managed information used to change storage destinations of files, this storage destination changing condition managing table 123 is used when a file is moved by the file move processing unit 213. Referring now to FIG. 6, concrete information managed in the storage destination changing condition managing table 123 is explained. The storage destination changing condition managing table 123 manages information used to change the following storage destinations of files, namely, storage destination changing condition IDs corresponding to such IDs which exclusively identify storage destination changing conditions; move destination reference path IDs which indicate reference path IDs of files which constitute move subjects; move destination reference paths which correspond to reference paths as to mode destinations of files; sorts of storage destination changing conditions and values of the storage destination changing conditions which indicate conditions for changing storage destinations of files.

Substances of files are stored in the file substance managing unit 130 by the file move processing unit 213. It should also be understood that the file substance managing unit 130 may be arranged by not only a structure within one client, but also a structure formed via a network such as WAN (Wide Area Network), LAN (Local Area Network), and the Internet.

Among storage structures (logical storage structures) displayed to a user and storage structures (physical storage structures) for management purpose, the folder/file display processing unit 211 displays both a logical folder and a file which has been stored in the logical folder to the user. At this time, the user need not become aware of a physical storage destination of the file in an operation of the file. For instance, in FIG. 8, in the case that the user displays a content of a file 311 which has been stored in a folder 310 of a volume 300, a content of a file 708 which has been stored in a filter 707 of a volume 706 is displayed.

The folder/folder operation processing unit 212 performs an operation process of a file in accordance with an operation designated by the user. As previously explained, an operation of a user is carried out via the folder/file display processing unit 211. For example, in the case that a user refers to a content of a file, the folder/file operation processing unit 212 judges a storage destination of a file substance, and acquires the corresponding file from the file substance managing unit 130.

The file move processing unit 213 selects such a reference path capable of satisfying a condition for changing a storage destination of a file from the file information managing table 121 based upon information which has been set in the storage destination changing condition managing table 123. Next, this file move processing unit 213 moves such a file present under the selected reference path to a location under the move destination reference path set in the storage destination changing condition managing table 123.

The file storage processing unit 210 acquires such information as a producer of a file designated by a user and a file size, and also, acquires a path which constitutes a reference of a storage destination of the file from the reference path information managing table 120, and then, stores the acquired information into the file information managing table 121. Also, the file storage processing unit 210 stores a substance of a file into the file substance managing unit 130.

Figure 9:
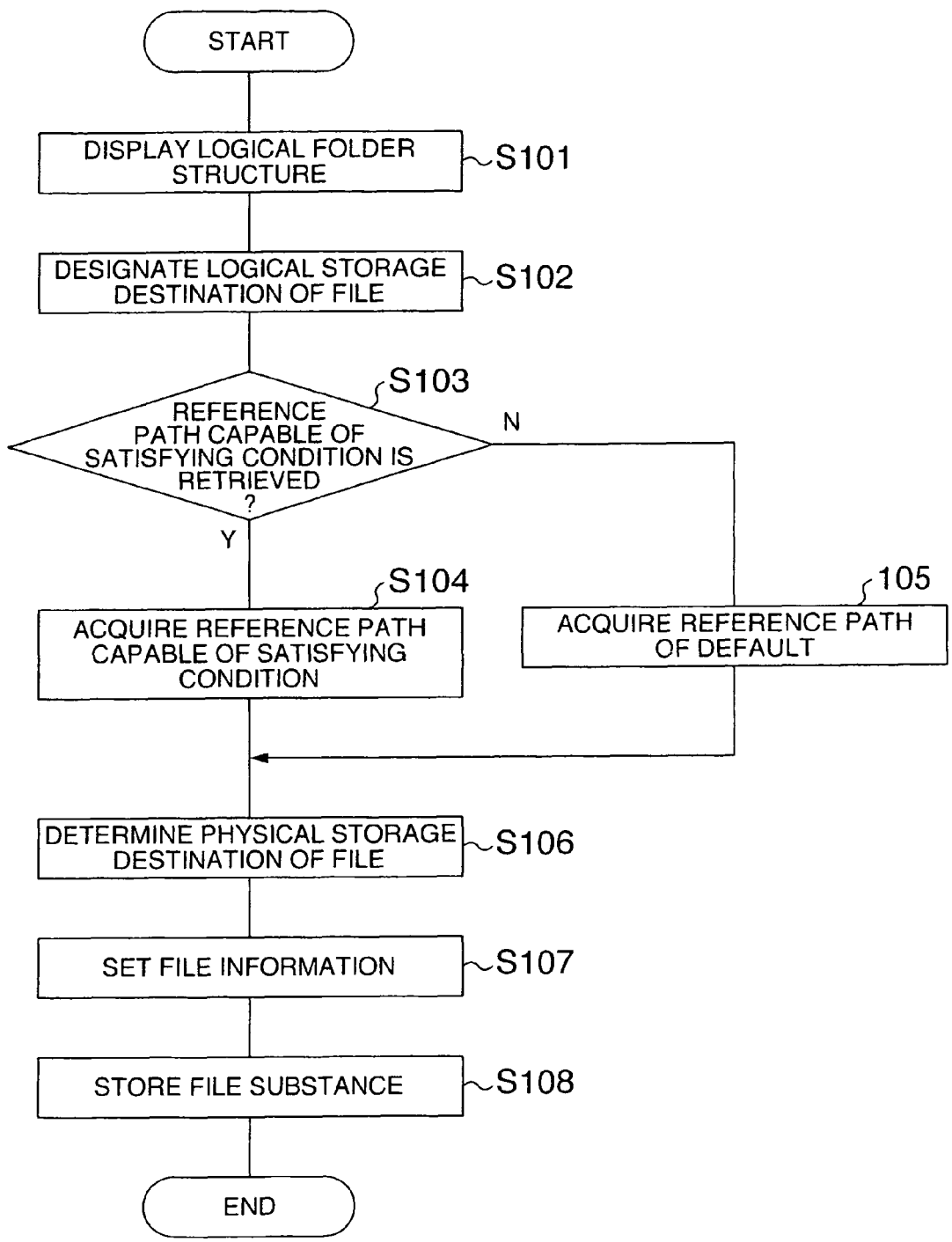
FIG. 9 is a flow chart for describing a process sequence for registering a file.

Referring now to FIG. 9, a description is made of a process sequence executed when a file is registered in this embodiment mode. In this case, as shown in FIG. 7, a description is made by employing such a concrete example that a text file called as a file "A311" is registered to a folder "A310."

In the folder/file display processing unit 211, a list of mother folder IDs is acquired from the folder information managing table 122, a mother/child relationship of folders is defined, and then, a structure of logical folders is formed. For example, in the folder information managing table 122, since a mother folder ID as to a folder "Folder ID_C" and a folder "Folder ID_D" corresponds to "Folder ID_B", as indicated in FIG. 7, this drawing indicates that both a folderC 313 and a folderD 314 are located under a folderB 312. Since the hierarchical structure of the folder information managing table 122 of FIG. 5 is traced, a logical directory structure of the folders can be displayed. Also, as shown as the logical storage structure of FIG. 8, a directory structure may be displayed in the form of a tree. In this embodiment, the directory structure is managed by tables, but alternatively may be managed by paths.

Next, the folder/file display processing unit 211 acquires a folder ID of such a folder which is displayed to a user, and acquires such a file information that this acquired folder ID is made coincident with the folder ID of the logical storage destination of the file information managing table 121. Based upon both the structure of the formed logical folder and the acquired file information, the folder/file display processing unit 211 displays the structure of the logical folder and the structure of the file to the user (step S101).

An image of a folder structure as viewed from the user will now be described with reference to FIG. 7. In FIG. 7, while the highest grade is assumed as a volumeX 300, the floderA 310, the folderB 312, the folderC 313, and the folderD 314 are represented.

While the user employs both the structure of the logical folder and the structure of the folder displayed in the step S101, the user designates both a file to be registered and a logical storage destination of the file (step S102). Concretely speaking, in FIG. 7, the user designates such a text file called as the fileA 311 as the file which should be file, and designates the folderA 310 located under the volumeX 300 as the logical storage distortion of the file.

Based upon the file information of the file designated in the step S102, the folder/file display processing unit 211 retrieves and acquires such a reference path information which can satisfy all of reference path allocation conditions 1, 2, 3 from the reference path information other than both "default" and "back-up" which are defined by a manager (steps S103 and S104). As to reference path information in which the reference path allocation condition of the reference path information managing table 120 is "NO", there is no designation of the condition, and even any of files can satisfy the condition.

In the case that a plurality of reference path information capable of satisfying the conditions are present, such path information that quantities of coincident conditions other than condition "NO" become the largest number is acquired as the reference path information. Also, in the case that quantities of coincident conditions are equal to each other in reference path information, such a reference path information in which an empty size capacity is the largest capacity is acquired.

For instance, in such a case that the fileA 311 corresponds to a text file having a file size of 100 KB which has been registered by a user "A", as reference path information which can satisfy all of the reference path allocating conditions 1, 2, 3, such a reference path information of "Group ID_A" is sub-selected under the following conditions: the file sort of the reference path allocation condition 1 is [txt]; the file producer of the condition 2 is [userA]; and the file size of the condition 3 is [none]. Also, such a reference path information of "Group ID_F" is selected under the following conditions: the file sort of the reference path allocation condition 1 is [none]; the file producer of the condition 2 is [userA]; and the file size of the condition 3 is [none]. Furthermore, such a reference path information of "Group ID_G" is selected under the following conditions: the file sort of the reference path allocation condition 1 is [none]; the file producer of the condition 2 is [userA]; and the file size of the condition 3 is [smaller than, or equal to 300 KB].

Since as the reference path information capable of satisfying the conditions, three sets of "GroupID_A", "Group F", and "Group_G" the quantities of the coincident conditions other than the condition "none" are compared with each other in this case. In GroupID_A, since only the condition 3 is "none", the conditions other than "none" are two conditions, namely the conditions 1 and 2. In GroupID_A, since the conditions 1 and 3 are "none", the condition other than "none" is one condition, namely the condition 2. On the other hand, in GroupID_G, since only the condition 1 is "none", the conditions other than "none" are two conditions, namely the conditions 2 and 3.

Since the total numbers of coincident conditions other than the condition "none" as to both GroupID_A and GroupID_G are larger than the total number of coincident numbers other than the condition "none", both GroupID_A and GroupID_G are selected. Although the quantities of coincident conditions other than the condition "none" as to GroupID_A and GroupID_G are two, namely the same numbers, since the empty size of GroupID_A is large, such a reference path information that the reference path ID is GroupID_A is finally acquired.

In such a case that such a reference path information where a file can satisfy a reference path allocating condition is not present among the reference path information in which sorts of reference paths are other than "default" and "back-up", such a reference path information as the reference path information of the default is acquired from the reference path information managing table 120 (step S105).

In the case that there are plural pieces of the reference path information of the default, in the reference path information managing table 120 of this embodiment, the reference path allocating condition 3 is applied thereto, so that reference path information is selected. Concretely speaking, in the case that a capacity of a file to be stored is larger than 500 Kbytes, default2 is selected, whereas in the case that a capacity of a file to be stored is smaller than, or equal to 500 Kbytes, default1 is selected. In addition to this embodiment, another method may be alternatively employed. That is, while the reference path allocating condition is not applied, such a reference path information that an empty size capacity is large may be selected.

In the file storage processing unit 210, the reference path acquired in other the step S104 or the step S105, the relative path of the logical folder designated by the user, and the substance name of the file are coupled to each other so as to determine such a path which constitutes a physical storage destination of the file (step S106).

Concretely speaking, the file storage processing unit 210 couples a reference path [D:¥A] of a folder in which the reference path ID acquired in the step S104 corresponds to GroupID_A, a relative path [TXTFolder¥] of a physical folder which has been set with respect to the folder A in the folder information managing table 122 of FIG. 5, and a substance name [file1.txt] of a file to each other so as to determine such a path [D:¥A¥ TXFolder¥ file1.txt] which constitutes the physical storage destination of the file.

In the file storage processing unit 210, the information of the file designated by the user is set to the file information managing table 121 (step S107). Concretely speaking, such an information of a record whose file ID corresponds to "FileID_A" is set to the file information managing table 121.

Figure 8:
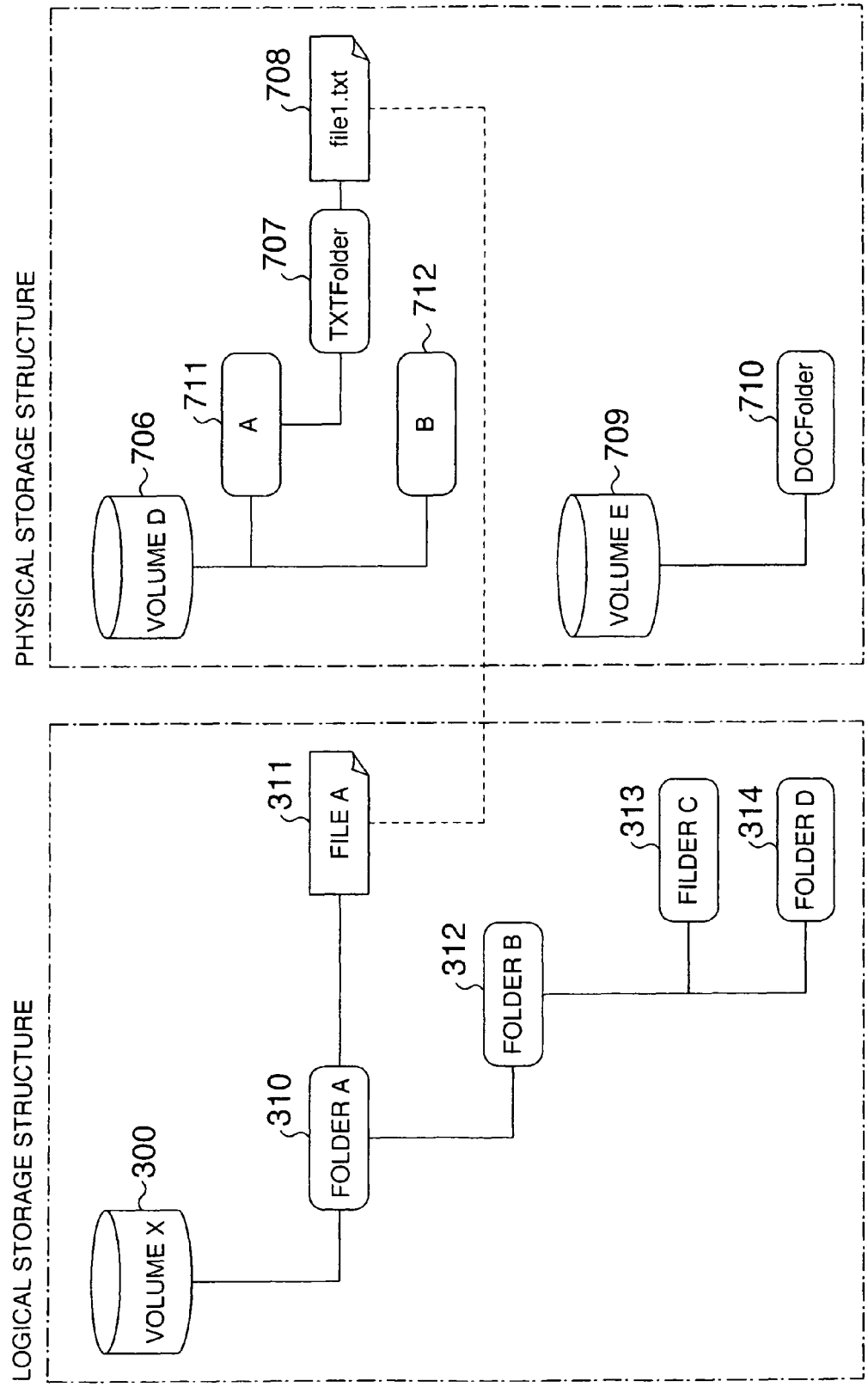
FIG. 8 is a diagram for illustratively showing an example as to both a logical storage structure and a physical storage structure.

In the file storage processing unit 210, the substance of the file is stored into such a path which constitutes the physical storage destination of the file determined in the step S106 (step S108). In the case that the fileA 311 is registered, both a logical storage structure and a physical storage structure are represented in FIG. 8. Although it may be seen that the registered fileA has been stored in [X:¥folderA] as viewed in the logical storage structure of FIG. 8, in an actual case, the file has been stored in the path [D:¥A¥ TXTFolder¥ file1.txt] determined in the step S106.

Similarly, the fileC has been stored in the foldeC, and the fileC2 has been stored in the folderC2, namely have been logically stored in the separate folders. However, both the fileC and the fileC2 have been physically in the same folder of [E¥DOCFolder].

In this embodiment, when the reference path information is acquired (namely, steps S103 to S105 shown in FIG. 9), the plurality of reference path allocating conditions have been employed. Alternatively, a single reference path allocating condition may be employed. Also, in this embodiment, the reference path information capable of satisfying all of the reference path allocating conditions 1, 2, 3 is retrieved to be acquired. Alternatively, reference path information capable of satisfying the reference path allocating condition 1 may be retrieved, and then, reference path information capable of satisfying the next reference path allocating condition 2 may be retrieved from the relevant reference path information so as to be acquired. Similarly, another retrieving/acquiring method may be alternatively employed. That is, reference path information capable of satisfying the reference path allocating conditions is sequentially retrieved so as to be acquired until such a reference path information capable of satisfying the reference path allocating condition becomes 1. Also, in this embodiment, when all of the reference path allocating conditions have been confirmed, in such a case that plural pieces of the reference path information which have been finally acquired are present, such a reference path information whose empty size is large is selected. Alternatively, specific reference path information, for example, first reference path information may be acquired.

Also, in the case that a plurality of reference path allocating conditions are used, weights may be alternatively provided among these allocating conditions, and when reference path information is acquired, such a condition which should be necessarily satisfied may be alternatively determined. For instance, in the reference path information managing table 120 of FIG. 3, considering such a case that the above-described file A31 corresponds to a text file having a file size of 100 KB (Kbytes) registered by the user A, in accordance with the above-explained method, while the coincident conditions other than the condition "none" as to GroupID_A and GroupID_G are two, namely the same quantities, since the empty size of GroupID_A is larger than that of GroupID_G, GroupID_A has been finally acquired. In contrast, in such a case that the reference path allocating condition 3 must be necessarily satisfied (namely, condition 3 is not "none"), the condition 3 is "none" in GroupID_A, whereas the condition 3 is not equal to "none" in GroupID_G, so that the reference path ID of GroupID_G is acquired.

Figure 10:
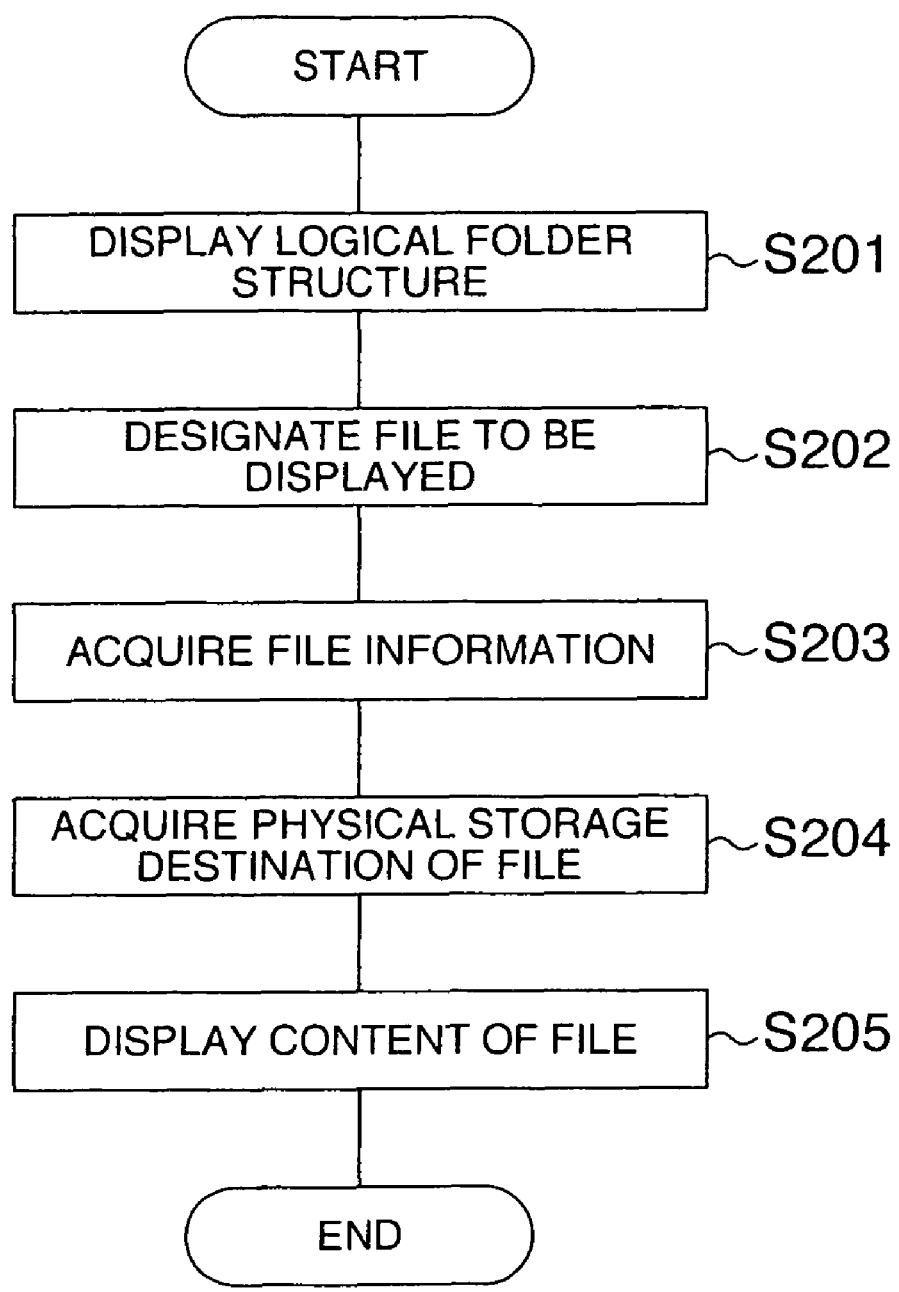
FIG. 10 is a flow chart for describing a process sequence for displaying a file.

Next, a process sequence executed when a file is acquired in this embodiment is indicated in FIG. 10, and will now be described by employing such a concrete example in the case that the file A311 shown in FIG. 8 is displayed.

In the folder/file display processing unit 211, a list of mother folder IDs is acquired from the folder information managing table 122, a mother/child relationship of folders is defined, and then, a structure of logical folders is formed. For example, in the folder information managing table 122, since a mother folder ID as to a folder "FolderID_C" corresponds to "FolderID_B", as indicated in FIG. 8, this drawing indicates that a folderFolderID_C is located under a folderFolderID_B.

Next, the folder/file display processing unit 211 acquires a folder ID of such a folder which is displayed to a user, and acquires such a file information that this acquired folder ID is made coincident with the folder ID of the logical storage destination of the file information managing table 121. Based upon both the structure of the formed logical folder and the acquired file information, the folder/file display processing unit 211 displays the structure of the logical folder and the structure of the file to the user (step S201).

While the user employs both the structure of the logical folder and the structure of the folder displayed in the step S201, the user designates both a file to be acquired and a logical storage destination of the file (step S202). Concretely speaking, the user designates such a text file called as the fileA 311 as the file which should be file in the logical storage structural of FIG. 8 which is displayed to the user.

Such file information as a file ID, a reference path ID, and a relative path of the file designated in the step S202 is acquired from the file information managing table 121 (step S203).

Concretely speaking, such file information as a file ID [FileID_A], a reference path ID [GroupID_A], and a relative path [TXTFolder¥ file1.txt], which correspond to the fileA 311 designated by the user, is acquired from the file information managing table 121.

The folder/file display processing unit 211 couples a reference path corresponding to the reference path ID which has been set to the file information to the relative path of the physical storage destination which has been set to the file information acquired in the step S203 so as to acquire a physical storage destination of the file (step S204). Concretely speaking, in the file information managing table 121, the relative path of the physical storage destination of the fileA 311 is [TXTFolder¥ file1.txt]. The reference path ID of the fileA 311 corresponds to [GroupID_A], and such a reference path that the corresponding reference path ID of the reference path information managing table 120 becomes [GroupID_A] corresponds to [D:¥A]. The folder/file display processing unit 211 couples these paths to each other so as to acquire the physical storage destination [D¥A¥ TXTFolder¥ file1.txt] of the fileA 311.

In the folder/file operation processing unit 212, a substance of a file which is displayed is acquired from the storage destination of the file acquired in the step S204 (step S205). As a result, the folder/file display processing unit 211 displays the substance [file1.txt] of the file corresponding to the fileA 311 designated by the user to the user.

Next, a process sequence executed when a storage destination of a file is changed will now be explained with reference to FIG. 11 in this embodiment.

One reference path ID is acquired from the reference path information managing table 120. Next, all of file information is acquired to which the reference path ID acquired in the step S302 has been set (step S301 and step S302).

One condition for changing a storage destination of a file is acquired from the storage destination changing condition managing table 123 of FIG. 6 is acquired (step S303).

Both the file information acquired in the step S302 and the information of the storage destination changing condition managing table 123 are confirmed every reference path acquired in the step S301, and a confirmation is made as to whether or not a condition for changing a storage destination of a file can be satisfied (step S304).

In the case that the condition for changing the storage destination of the file is satisfied, the physical storage destination of the file is changed (step S305).

Concretely speaking, in such a case that the file storage destination changing condition acquired in the step S303 corresponds to [ConditionID_B1], a move source reference path ID corresponds to GroupID_B, and the storage destination changing condition which has been stored in the storage destination changing condition managing table 123 of FIG. 6 corresponds to [average value of preceding access days of file under reference path is larger than, or equal to 30 days]. In the file information managing table 121 of FIG. 4, since such a file that the reference path ID is GroupID_B corresponds to the file B and a total of days from the final access day is 40 days, the storage destination changing condition can be satisfied. In the case that there are plural files, an averaged value of total days from the final access days of these plural files is calculated.

In this embodiment, as the sort of the storage destination changing condition, the average value of the preceding access days as to the file under the reference path. Alternatively, as the storage destination changing condition, a total size of files under a reference path, a total film number under a reference path, a owner of a file, a total access time of a file, a total access frequency of a file, a file size, a preceding access day of a file, or an overaged value and a total value of these conditions as to a plurality of files under a reference path may be designated. In such a case that a total size of files under a reference path is designated, a total value of file sizes of such files located under this reference path is calculated every reference path ID of the file information managing table 121, and then, the calculated total value is compared with a value of a storage destination changing condition. In the case that a total file number under a reference path is designated, a total file number of such files located under this reference path is calculated every reference path ID of the file information managing table 121, and then, the calculated total value is compared with a value of a storage destination changing condition.

Figure 11:
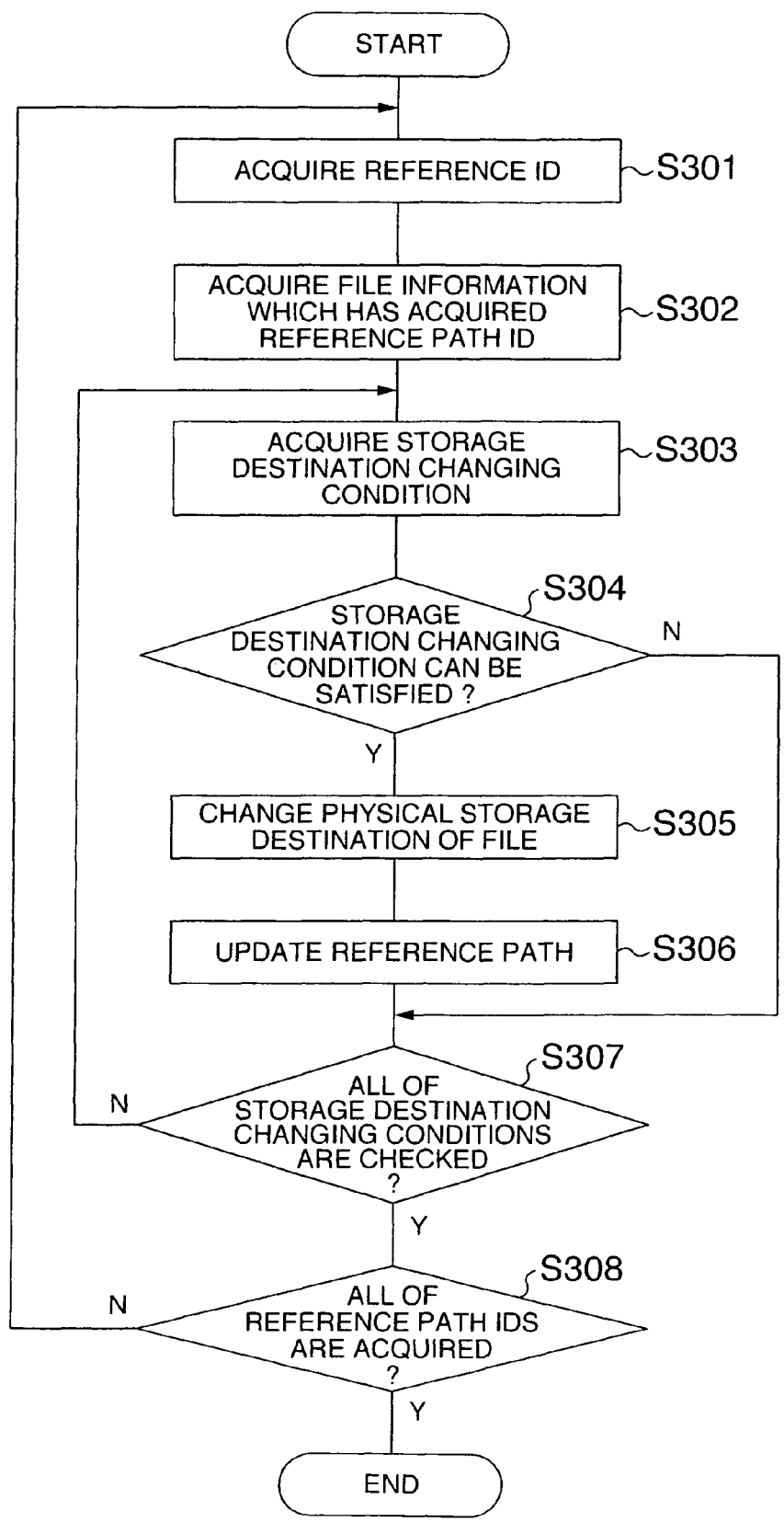
FIG. 11 is a diagram for indicating a process sequence for changing a storage destination of a file.

In this embodiment, in the process operation of the step S304 shown in FIG. 11 when the storage destination of the file is changed, the averaged value of the preceding access days of the file under the reference path is calculated. Alternatively, an average value of total days from a final access day, a total size of files under a reference path, a total file number under reference paths, a total value of access times as to a file under a reference path, and also, an averaged value of access frequencies of a file under a reference path may be previously managed with respect to each of reference paths in the reference path information managing table 120.

As to a file capable of satisfying the file storage changing condition, the file move processing unit 213 moves the file under a move destination reference path (step S305).

Concretely speaking, when the above-described storage destination changing condition [ConditionID_B1] is employed, such a file belonging to the reference path ID [GroupID_B] corresponds to only the fileB 312, and a total day number from the file access day of this fileB 312 is equal to 40 days. As a result, the reference path ID [GroupID_B] can satisfy the storage destination changing condition, so that the physical storage destination as to the fileB 312 belonging to the reference path ID [GroupID_B] is changed under the move destination reference path. As to this fileB 312, the reference path ID of the file information managing table 121 corresponds to [GroupID_B]; the relative path corresponds to [file2.gif]; and the reference path corresponding to the reference path ID [GroupID_B] from the reference path information managing table 120 is [D:¥B], so that the physical storage place before the fileB 312 is changed corresponds to [D:¥B¥ file2.gif]

The move destination reference path of the storage destination changing condition [Condition ID_B1] corresponds to [Z:¥] from the information of the storage destination changing condition managing table 123 shown in FIG. 6. As a consequence, the fileB 312 is changed from the reference path [D:¥B] of the reference path ID [GroupID_B] before the fileB 312 is changed into this move destination reference path [Z:¥]. Since the relative path of the fileB 312 corresponds to [file2.gif], the file move processing unit 213 moves the fileB 312 from [D:¥BY file2.gif] to [z:¥ file2.gif] so as to change the physical storage destination.

While the storage destination of the file is changed, the reference path of the storage destination after the destination change is set to the reference path of the reference path ID acquired in the step S301 (step S306).

Concretely speaking, as to the reference path information in which the reference path ID of the reference path information managing table 120 corresponds to [GroupID_B], the value of the reference path is changed from [D:¥B] into [Z:¥]. As a result, as to all of the files belonging to the reference path ID [GroupID_B] in the file information managing table 121, the physical storage destination is moved from [D:¥B] into [Z:¥].

The storage destination changing process operation subsequent to the step S303 is repeatedly carried out as to all of the storage destination changing conditions contained in the reference path ID storage destination changing condition managing table 123. After the storage destination changing process operations with respect to all of the storage destination changing conditions are carried out, the storage destination changing process operations as to this reference path ID is accomplished (step 307), and then, a storage destination changing process operation as to the next reference path ID is carried out (step 308).

In the case that the storage destination changing process operation after the step S301 as to all of the reference paths is accomplished, the process operation is ended (step S308).

Concretely speaking, as to the above-described reference path ID [GroupID_B] of the reference path information managing table 120, in such a case that the storage destination changing process operations are accomplished with respect to all of the storage destination changing conditions of the storage destination changing condition managing table 123, the storage destination changing process operation is similarly carried out with respect to the next reference ID [GroupID_C]. Then, after the storage destination changing process operations as to all of the reference path IDs are accomplished, the storage destination changing process operation defined in FIG. 11 is ended.

In such a case that a high performance volume is used as a normal business purpose and a low performance volume is used as a back-up purpose, since the storage destination changing process operation of FIG. 11 is carried out in a periodic manner, files whose access frequencies have become low can be sequentially moved to the low performance volume. It should be noted that if the high permanence volume corresponds to, for example, a physical volume, then a Fiber channel hard disk and the like are employed and if the high performance volume corresponds to a logical volume, then a volume made by assembling RAID5 and the like are employed, whereas if the low permanence volume corresponds to, for example, a physical volume, then an ATA hard disk and the like are employed and if the low performance volume corresponds to a logical volume, then a volume made by assembling RAID1 and the like are employed.

It should also be noted that as to the above-described storage destination changing condition ID being [Condition ID_B1], the reference destination reference path corresponds to such a physical path [Z:¥]. Alternatively, as explained as to [Condition ID_C], the reference path ID of the reference path information managing table 120 may be used as the move destination reference path.

A flag (not shown) for judging as to whether a move destination reference path corresponds to a physical path, or a reference path ID has been stored in the storage destination changing condition managing table 123. The folder/file operation processing unit 212 judges as to whether a move destination corresponding to a storage destination changing condition corresponds to a reference path, or a reference path ID based upon the flag.

Concretely speaking, in the case that the file storage destination condition acquired in the step S303 is [ConditionID_C], the move source reference path ID corresponds to [GroupID_C], and the storage destination changing condition set to the storage destination changing condition managing table 123 of FIG. 6 corresponds to [preceding access days of file are larger than, or equal to 30 days]. In the file information managing table 121 of FIG. 4, such a file that the reference path ID thereof is [GroupID_C] corresponds to both the file C and the file C2. Since a total day number from the final access day is 1 day as to the fileC, this fileC does not satisfy the storage destination changing condition, whereas since a total day number from the final access day is 35 days as to the fileC2, this fileC2 can satisfy the storage destination changing condition.

Only to the file C2 which can satisfy the storage destination changing condition, the physical storage destination thereof is changed under the move destination reference path. As to this file C2, the reference path ID of the file information managing table 121 corresponds to [GroupID_C]; the relative path corresponds to [DOCFolder¥ file3.doc]; and the reference path corresponding to the reference path ID [GroupID_C] from the reference path information managing table 120 corresponds to [E:¥]. As a consequence, the physical storage place of this file C2 before this file C2 is change corresponds to [E:¥ DOCFolder¥ file3.doc].

The move destination reference path of the storage destination changing condition [ConditionID_C] corresponds to [Secondary_Y] from the information of the storage destination changing condition managing table 123 of FIG. 6, and the reference path corresponding to the reference path ID [Secondary_Y] corresponds to [Y:¥] from the reference path information managing table 120. Since the relative path of the file B corresponds to [DOCFolder¥ file3.doc], the file move processing unit 213 moves this fileB from [E:¥ DOCFolder¥ file3.doc] to [Y:¥ DOCFolder¥ file3.doc] so as to change a physical storage destination.

Since the storage destination of the file is changed, the reference path ID of the changed storage destination is set to the file information managing table 121 (step S306).

Concretely speaking, as to the file C2 of the file information managing table 121, the reference path ID is changed from [Group ID_B] to [Secondary_Y]. As a result, the physical storage destination is moved from [E:¥] to [Y:¥].

As previously explained [ConditionID_B1] of the storage destination changing condition managing table 123, when such a physical path [Z:¥] is designated as the move designation reference path, since the information of the reference path of the reference path information table 120 is rewritten, the physical storage destinations as to all of the files under the reference path can be changed. On the other hand, as previously explained [ConditionID_C], when the reference path ID such as [Secondary_Y] is designated as the move destination reference path, a judgement is made as to whether or not the storage destination changing condition can be satisfied as to each of the files of the file information managing table 121, and then, since the reference path ID is rewritten, the physical storage destinations can be changed every file.

For example, in such a case that a high performance volume whose managing cost is high is used for the normal business purpose and a low performance volume whose managing cost is low is used for the back-up purpose, as to such a folder which has stored thereinto a content of an accomplished cost, a physical path of such a low performance volume as [Z:¥] is designated as the move destination reference path, so that physical storage places of files contained in this folder which is not accessed for a predetermined time period can be changed into the low cost volume whose managing cost is low in a both manner. On the other hand, in such a case that respective mail data as to a mail folder are managed as files, such a reference path ID of a low performance volume as [Secondary_Y] is designated as the move destination reference path, so that mail data which are not accessed for a predetermined time period can be moved to a low performance volume whose managing cost is low every file of the individual mail data.

Alternatively, while the reference path of the move destination is not designated in the storage destination changing process operation, the process operation executed when the file of FIG. 9 is registered may be again executed. In this alternative case, only the move source reference path is designated, the storage destination registering process operation of FIG. 9 is carried out as to files under this reference path in accordance with the reference path allocating condition of the reference path information managing table 120. When the storage destination of the file is changed by executing this storage destination registering process operation, the reference path ID of the file information managing table 121 is changed into the reference path ID after the change.

As previously explained, since the physical storage places and the logical storage places are managed in a separate manner, even in such a case that a physical storage place is changed, the logical storage place thereof which is displayed to the user is not changed, but also, even when such data whose important degrees are low are sequentially moved to a low performance volume, since the logical storage places which can be seen by the user are not changed, the user can use the files while the user need not become aware of the changes as to the storage places.

In accordance with the present invention, not only the data may be moved from the high performance volume to the low performance volume, but also the data may be conversely moved from the low performance volume to the high performance volume. In such a case that a high performance volume is newly conducted, this newly conducted volume is registered as a reference path in the reference path information managing table 120, and this newly conducted volume is designated to the move destination reference path as the storage destination changing condition of the storage destination changing condition managing table 123. As a result, for example, such data related to a presently used important project may be moved to the newly conducted volume in a batch manner. In this case, since the logical storage place is not changed, the user may view that the storage places of the files, or the folders are not completely changed. However, in an actual case, since the data are moved to the high performance volume, the performance may be improved.

Also, since the physical storage places and the logical storage places are managed as the directory structures and the hierarchical structures, while the users, the networks, and the data are managed in the batch manner, these items can be easily managed in the case that a total number of data are increased up to several thousands of pieces, or more. Furthermore, the information under the reference path may be changed in a batch manner every path, so that the physical storage places can be easily managed.

Also, since such physical storage places are also arranged as the directory structure, these physical storage places may be managed while the user may become aware of the paths. As a result, not only the physical storage places of the respective data are not changed based upon changes in attributes of the respective data, the physical storage places may be changed as the entire path based upon an attribute of this path. In other words, the physical storage places may be changed based upon the changes of the attributes as to all of the data which belong to paths lower than this path. For instance, if access frequencies of all of the data located under this path become low, then an access frequency to this path is lowered, and thus, it is conceivable that all of the data located under this path are equal to such data whose use frequencies are low and whose important degrees are low. Therefore, all of these data located under this path may be moved to another volume.

In this case, when such a back-up drive as a DVD drive and a tape drive is designated as a move destination volume, the data whose important degrees may be stored into a DVD, or a tape in a batch manner. Also, in the case that the physical storage positions have been moved to a portable medium in the above-described manner, such information capable of identifying paths and media may also be stored at the same time.

Since both the physical storage places and the logical storage places are separately managed as either the directory structure or the hierarchical structure, a plurality of physical volumes are allocated with respect to a single logical directory structure as an actual storage destination of a volume, and thus, the files may be managed.

Also, in such a case that a plurality of physical volumes have been allocated to a signal logical volume, the respective plural physical volumes may be also managed based upon the directory structure. Alternatively, the directory structures with respect to the plural physical volumes may be managed as the directory structures with respect to a single logical volume.

While the physical storage places and the logical storage places are managed as the directory structures and the hierarchical structures, since the users need not become aware of the physical storage places thereof, only such a logical directory structure as shown in FIG. 7 may be merely displayed on the display apparatus 107 to the users. However, there are some cases that if such correspondence relationship between the logical storage places and the physical storage places is displayed, then there is a merit as to a management matte. In such a case, as indicated in FIG. 8, the logical directory structure may be alternatively displayed in combination with the physical directory structure, and an actual physical storage destination of files stored in the logical directory structure as represented by a dot line connected between a "fileA" and "file.txt" of FIG. 8 may be alternatively and clearly displayed.

Figure 14:
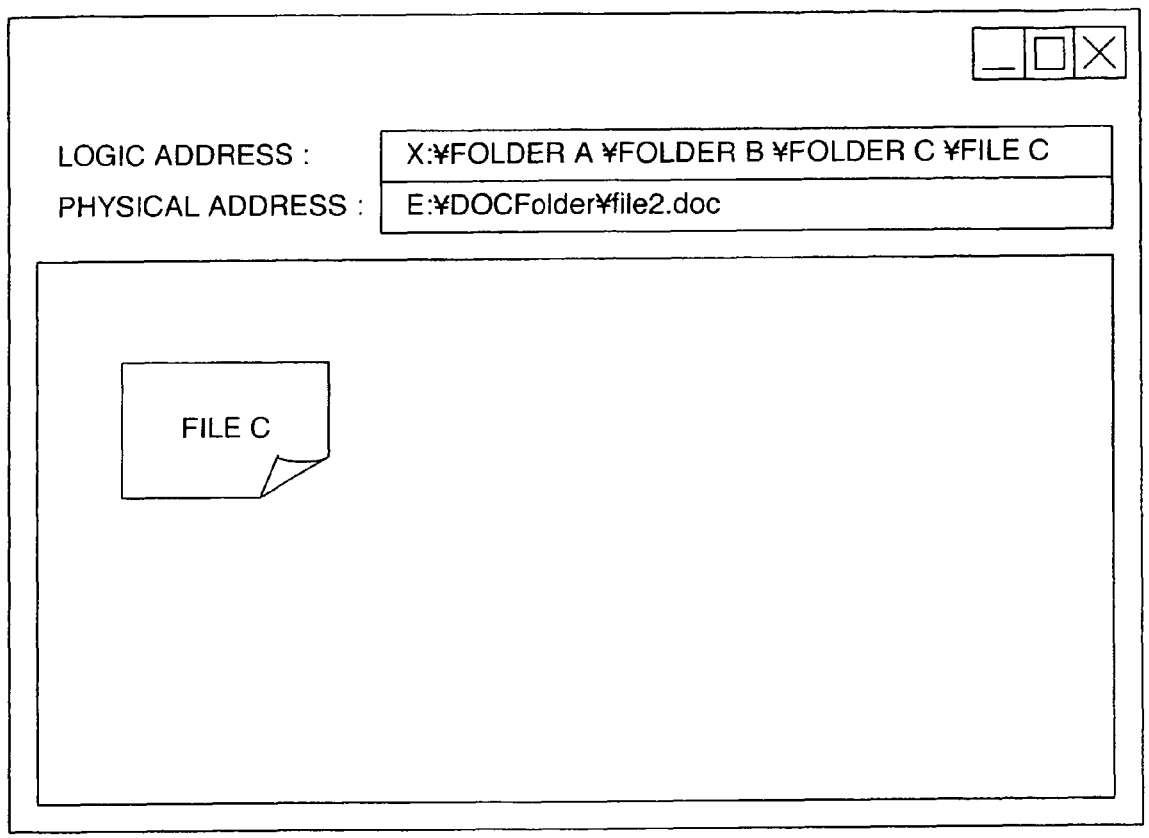
FIG. 14 is a diagram for representing an example of a screen which displays a logic address and a physical address in correspondence with each other to a user.

Also, as shown in FIG. 14, when a logical folder is displayed to the user, a path indicative of a logical storage place corresponding to a file contained in this logical folder may be alternatively displayed in connection with a path indicative of a physical storage place.

In accordance with this embodiment, while an attention is paid to file movement between paths containing a logical volume name, the user does not become aware of a medium sort of the paths. Alternatively, medium sorts of the paths may be stored in both the reference path managing table 120 and the storage destination changing condition managing table 123. As a result, in such a case that files which have been stored in a fixed medium such as a hard disk in accordance with a storage destination changing condition is moved to a portable medium such as a tape and a DVD, a medium sort of volumes which constitute storage destinations of these files may be clearly displayed.

In this embodiment, as the storage destination changing condition, the averaged value of the days from the preceding access day to the file has been defined. Alternatively, a total size of files, a total registration number of files, a holding time period of data, and a holding time limit of data may be defined as the storage destination changing condition.

In the case that the holding time period of the data is designated, and for example, data present under a reference path must be hold for 7 years, after the data present under this reference path has elapsed, the storage destination of this data may be changed into a low performance storage apparatus whose managing cost is low.

Also, in this embodiment, the system structural example in the single client has been explained. Alternatively, the inventive idea of the present invention may be realized in a system structural example via a network such as a WAN, a LAN, and an SAN.

Figure 12:
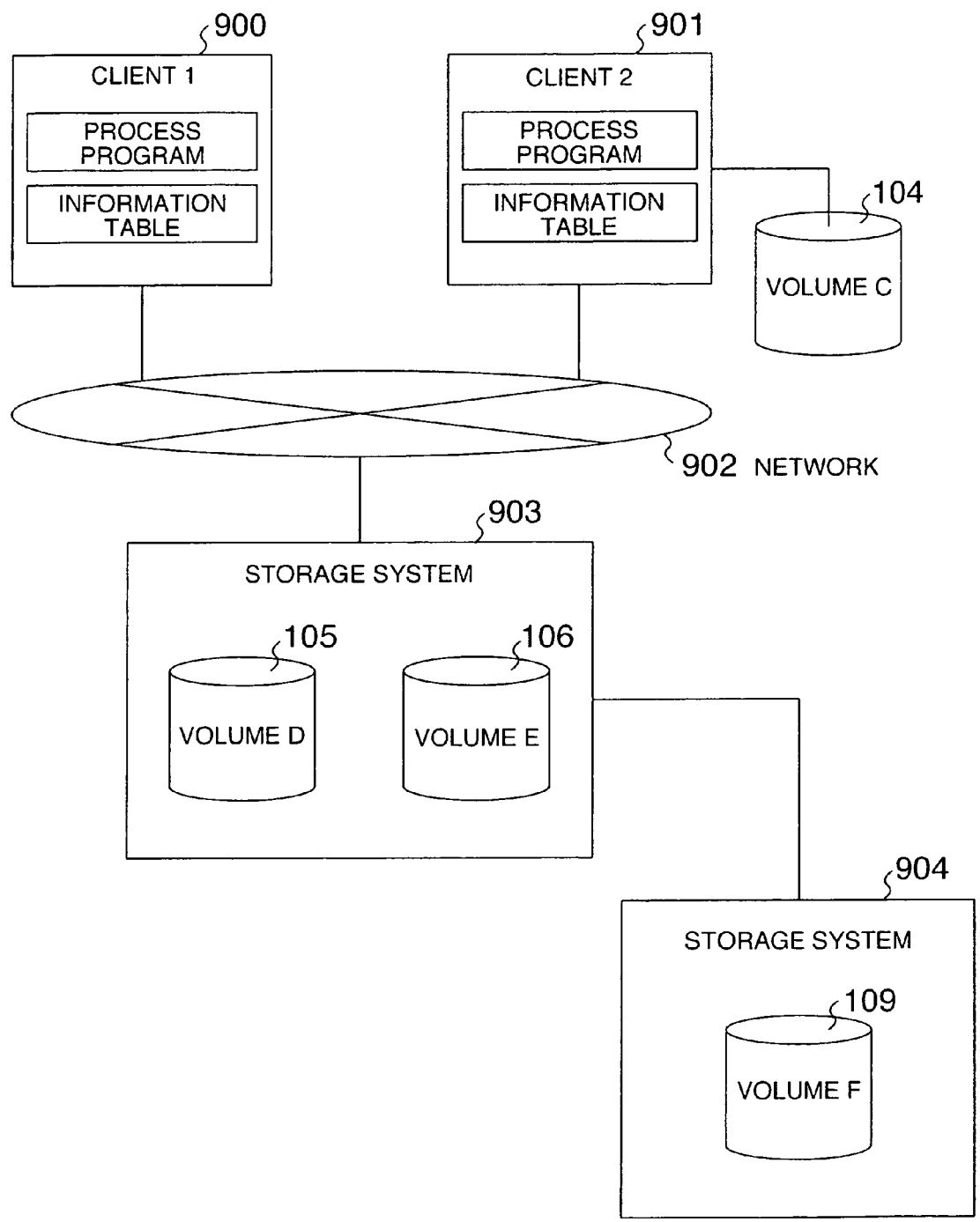
FIG. 12 is a diagram for indicating a structural example using a storage system.

Referring now to FIG. 12, a description is made of another embodiment example in the case that file substances are managed via such a network as a WAN, a LAN, and an SAN by employing a storage system. Also, another embodiment example will be described with reference to FIG. 13 in which a plurality of clients commonly utilize the same volume and file substances are managed by a separately provided file server.

In the file managing system of this embodiment shown in FIG. 12, both a client 900 and another client 901 are connected via a network 902 such as a WAN, a LAN, or an SAN to a volumeC 104 another volumeD 105, and a further volumeE 106, which constitute a storage destination of a file substance. Both the volumeD 105 and the volumeE 106 are managed by a storage system 903. While the storage system 903 manages a plurality of hard disks, the volumeD 105 and the volumeE 106 may be realized by physical volumes, or logical volumes owned by the storage system 904.

While the storage system 904 has been externally connected to the storage system 903, the volumeF 109 of the storage system 904 transmits and/or receives information via the storage system 903 with respect to a client. The volumeF 109 may be directly mounted by the storage system 903. Alternatively, such a storage system may be arranged. That is, while a virtual volume corresponding to the volumeF 109 is formed in the storage system 903, in such a case that a read/write request is issued from the client with respect to this virtual volume, information may be read/written with respect to the volumeF 109 by the storage system 903.

In the case that files are managed by employing the storage system 903, the following means may be provided: namely, a means for instructing to prohibit updating of a file when a user registers this file; a means for designating a storage time limit of the file; and a means for designating redundant file data. As the means for designating the prohibition of the file updating operation, for instance, a flag may be applied to a folder under a path, and a "Write Once" attribute may be set. Also, as the means for designating the storage time period of the file, for instance, a holding time period may be set to either a path or a folder under the path.

Concretely speaking, in the case that the prohibition for updating the file is designated, such a reference path may be applied as a storage destination of the file, to which the "Write Once" attribute may be set. This "Write Once" attribute does not permit updating of the file after being registered. It is so required that such a file which has been registered under the reference path to which the "Write Once" attribute has been set cannot be deleted from the physical volume. To this end, in the case that the user instructs a deletion of the file, the file storage processing unit 210 sets a deletion flag to the file information managing table 121. Since the user cannot refer to such a file to which this deletion flag has been set from the logical storage structural, and also, the file is deleted from the logical storage structure in this manner, the file managing system can show to the user such a virtual operation that the relevant file has been deleted.

As to such a file which seems to be deleted from the logical volume as explained above, since the deletion flags indicative of the deletions are set to the corresponding files within the physical folder structure, the file storage processing unit 210 can perform such a process operation that all of the physical files to which the deletion flags have been applied are deleted in the batch manner after a predetermined time period has elapsed, or in response to the deletion command.

Also, in the case that the holding time limit of the file is designated, such a reference path to which the designated holding time limit has been set may be applied. Furthermore, the folder/file operation processing unit 212 suppresses a deletion of a file within the holding time limit.

Also, in the case that the redundant process of the file data is designated, the below-mentioned two methods may be employed. The first method is performed as follows: That is, a plurality of reference paths capable of satisfying a reference path allocating condition are selected, and the same files are stored under the respective reference paths. In the case that a file which has been redundant-processed is displayed to the user, such a file under referable reference path is selected to be displayed to the user. The second method is carried out as follows: That is, in the case that there is a reference path which has already been redundant-processed, this reference path is allocated to a storage destination of a file. A reference path which has been redundant-processed corresponds to such a path, the duplication of which has been formed by, for example, RAID1, RAID1+0, a storage system.

Figure 13:
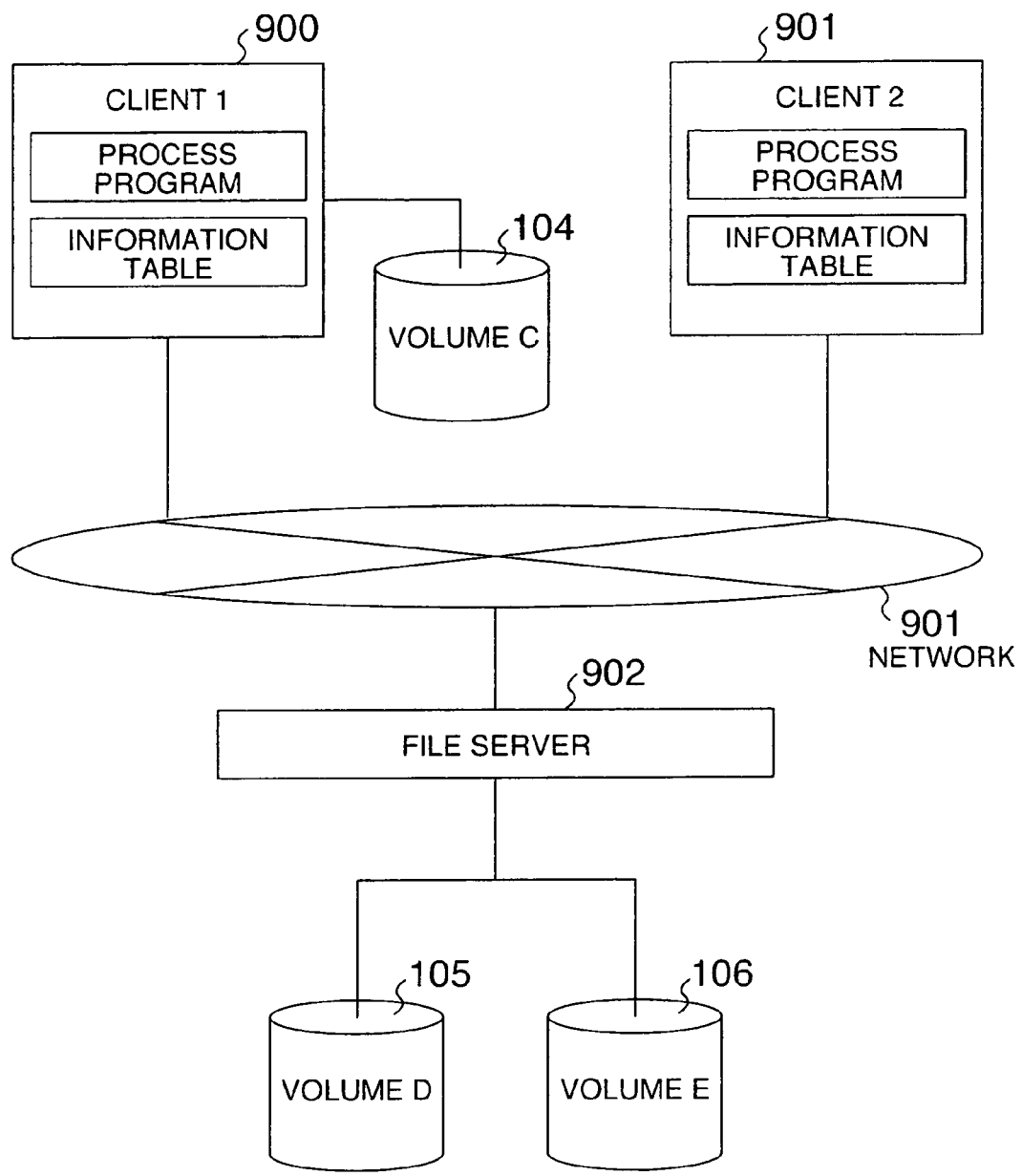
FIG. 13 is a diagram for showing a structural example using a file server.

FIG. 13 shows the file managing stem according to another embodiment is arranged by coupling a client 900 and another client 901 which are constituted by the above-described process program and information table, a volumeC 104 which constitutes a storage destination of a file substance of the client 901, both a volumeD 105 and another volumeE 106 which constitute a storage destination of a file substance which is commonly used by the client 900 and the client 901, and a file server 904 which manages both the volumeD 105 and the volumeE 106 to each other via a network 902 such an a WAN, a LAN, or an SAN.

Furthermore, another arrangement may be constituted by combining the system of FIG. 12 with the system of FIG. 13 as another embodiment mode of the present invention, which is connected from a file server to a storage system.

In the case that the file managing system is arranged via such a network as a WAN, a LAN, or an SAN, a reference path of the reference path information managing table 120 becomes such a value made by employing an IP address, a host name, a port ID, and a WWN (World Wide Name) such as [¥¥Server1¥D¥], and [¥¥192.168.1.100¥TXT.Folder¥].

Also, even in such a case that a plurality of clients are present, information tables which are managed by the respective clients are similar to those in the case that the system is arranged under a single client. Also, process operations for registering files and for acquiring files in the respective clients are carried out in a similar manner to such a case that the process operations are carried out under a single client.

However, in such a case that a plurality of clients are commonly present, and a commonly-used volume is used as a storage destination of a file substance, if the contents of the information tables of the respective clients are changed with respect to a file of the commonly-used volume, then there is such a risk that other clients cannot access a physical storage destination. As a consequence, these information tables must be synchronized with each other at constant timing. Although this synchronizing timing may depend upon operations of the file managing systems, it is desirable to execute the synchronizing timing before the file storage destination is changed. In this case, the respective managing tables may employ the arrangements managed by the respective clients, and also, may be alternatively managed by the commonly-used volume in the batch manner.

In the case that a plurality of clients use a commonly-used volume, while a file information managing table may be managed by each of these plural clients, a reference path information managing table may be commonly managed on the commonly-used volume. As a result, the following arrangement may be alternatively made. That is, since reference path IDs of the file information managing tables managed by the respective clients are rewritten, the respective files may be freely moved to the physical storage destinations. When the reference paths themselves of the reference path information managing tables are rewritten, approvals must be given from other clients.

Moreover, in the embodiment mode for utilizing the file server of FIG. 13, such an arrangement may be alternatively constructed. That is, information tables and process programs may be managed and processed by this file server.

In accordance with the present invention, since the storage destinations of the files are determined based upon the previously set condition, these files can be combined to be stored in a certain meaning unit, so that these files can be easily managed. Also, since the files are automatically moved based upon the previously set condition, these files are no longer required to be manually moved to another host, or another disk, and thus, the cumbersome operations by the system manager can be reduced. On the other hand, since the physical storage destinations of the files are separately managed, even in such a case that the physical storage destinations of the files are changed, the users can operate the files while the users become aware of the physical storage destinations of the files.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data managing method for managing a data managing device, the data managing device including a plurality of storage devices arranged to store files, and the data managing device managing both a table for managing the files and the files, the data managing method comprising the steps of:

storing, in both a folder information managing table and a file information managing table, information used for displaying a logical structure;

storing, in a reference path information managing table, a reference path ID indicating a storage position of each of the files;

storing, in a storage destination changing condition managing table, information regarding a storage destination changing condition associated with each of the reference path information;

acquiring, from the reference path information managing table, and in response to an instruction for changing a storage destination of a file, a reference path ID corresponding to the file for which the storage destination changing condition has been changed;

acquiring, from the storage destination changing condition managing table, the storage destination changing condition;

acquiring information regarding whether a storage destination change can be made for each of the reference paths respectively corresponding to each of the reference path ID from the storage destination change condition managing table;

examining whether the file for which the storage destination condition has been designated fulfills the file storage destination changing condition at a preceding access date for the file;

moving the file to a physical destination of a storage device corresponding to the file storage destination changing condition when the storage destination condition fulfills the file storage destination changing condition; and designating the reference path ID in the storage destination change condition management table to a reference path in the storage device to which the file has been moved.

2. A data managing device for managing both a table for managing the files and the files, the data managing device comprising:

a plurality of storage devices arranged to store files;
a display; and
a processor programmed to:

store, in both a folder information managing table and a file information managing table, information used for displaying a logical structure on the display;

store, in a reference path information managing table, a reference path ID indicating a storage position of each of the files;

store, in a storage destination changing condition managing table, information regarding a storage destination changing condition associated with each of the reference path information;

acquire, from the reference path information managing table, and in response to an instruction for changing a storage destination of a file, a reference path ID corresponding to the file for which the storage destination changing condition has been changed;

acquire, from the storage destination changing condition managing table, the storage destination changing condition;

acquire information regarding whether a storage destination change can be made for each of the reference paths respectively corresponding to each of the reference path ID from the storage destination change condition managing table;

examine whether the file for which the storage destination condition has been designated fulfills the file storage destination changing condition at a preceding access date for the file;

move the file to a physical destination of a storage device corresponding to the file storage destination changing condition when the storage destination condition fulfills the file storage destination changing condition; and designate the reference path ID in the storage destination change condition management table to a reference path in the storage device to which the file has been moved.

3. A computer program product for managing a data managing device, the data managing device including a plurality of storage devices arranged to store files, the computer program product comprising:

a computer program which causes the data management device to manage both a table for managing the files and the files; and a computer-readable storage medium having the computer program tangibly embodied thereon, wherein the computer program causes the computer to:

store, in both a folder information managing table and a file information managing table, information used for displaying a logical structure on the display;

store, in a reference path information managing table, a reference path ID indicating a storage position of each of the files;

store, in a storage destination changing condition managing table, information regarding a storage destination changing condition associated with each of the reference path information;

acquire, from the reference path information managing table, and in response to an instruction for changing a storage destination of a file, a reference path ID corresponding to the file for which the storage destination changing condition has been changed;

acquire, from the storage destination changing condition managing table, the storage destination changing condition;

acquire information regarding whether a storage destination change can be made for each of the reference paths respectively corresponding to each of the reference path ID from the storage destination change condition managing table;

examine whether the file for which the storage destination condition has been designated fulfills the file storage destination changing condition at a preceding access date for the file;

move the file to a physical destination of a storage device corresponding to the file storage destination changing condition when the storage destination condition fulfills the file storage destination changing condition; and designate the reference path ID in the storage destination change condition management table to a reference path in the storage device to which the file has been moved.

* * * * *